(12) United States Patent
Mijumbi et al.

(10) Patent No.: US 11,258,659 B2
(45) Date of Patent: Feb. 22, 2022

(54) MANAGEMENT AND CONTROL FOR IP AND FIXED NETWORKING

(71) Applicant: NOKIA SOLUTIONS AND NETWORKS OY, Espoo (FI)

(72) Inventors: Rashid Mijumbi, Dublin (IE); Abhaya Asthana, Framingham, MA (US); Carlos Bernal Paniagua, Madrid (ES); Manuel Castejon Cay, Madrid (ES)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/510,447

(22) Filed: Jul. 12, 2019

(65) Prior Publication Data

US 2021/0014107 A1    Jan. 14, 2021

(51) Int. Cl.
| | |
|---|---|
| *H04L 12/24* | (2006.01) |
| *H04L 41/0681* | (2022.01) |
| *H04L 41/069* | (2022.01) |
| *H04L 41/0631* | (2022.01) |
| *H04W 24/04* | (2009.01) |
| *H04L 41/0604* | (2022.01) |
| *H04L 41/147* | (2022.01) |

(52) U.S. Cl.
CPC ........ *H04L 41/0681* (2013.01); *H04L 41/064* (2013.01); *H04L 41/065* (2013.01); *H04L 41/069* (2013.01); *H04L 41/0622* (2013.01); *H04L 41/0636* (2013.01); *H04L 41/147* (2013.01); *H04W 24/04* (2013.01)

(58) Field of Classification Search
CPC ............. H04L 41/0681; H04L 41/0622; H04L 41/0636; H04L 41/064; H04L 41/065; H04L 41/069; H04L 41/147
See application file for complete search history.

(56) References Cited

U.S. PATENT DOCUMENTS

| | | | |
|---|---|---|---|
| 6,353,902 B1 | 3/2002 | Kulatunge et al. | |
| 6,707,795 B1 | 3/2004 | Noorhosseini | |
| 9,716,632 B2 | 7/2017 | Novak et al. | |
| 2004/0168100 A1* | 8/2004 | Thottan | H04L 41/065 714/4.1 |
| 2010/0332918 A1 | 12/2010 | Harnois | |
| 2011/0153236 A1* | 6/2011 | Montreuil | G01R 19/2513 702/59 |

(Continued)

OTHER PUBLICATIONS

Bellec, et al., "A new efficient clustering algorithm for network alarm analysis", in IASTED PDCS, pp. 638-643. (2005).

(Continued)

*Primary Examiner* — Jason D Recek
(74) *Attorney, Agent, or Firm* — Kramer Amado PC

(57) ABSTRACT

A method for managing alarms in a network includes identifying a first set of alarms based on data in a knowledge base, determining at least one attribute for each alarm in the first set of alarms, generating a model based on the at least one attribute, and applying the model to manage alarms in the network. The at least one attribute includes at least one of a persistence time for one or more alarms in the first set of alarms, an alarm group derived from the first set of alarms, and predictions for alarms in the first set of alarms. The model may be adaptively updated to track changing network conditions relating to the alarms.

20 Claims, 13 Drawing Sheets

(56) References Cited

U.S. PATENT DOCUMENTS

| | | | | |
|---|---|---|---|---|
| 2013/0006903 A1* | 1/2013 | Vishwakarma | ........ | G06Q 50/06 706/18 |
| 2016/0196587 A1* | 7/2016 | Eder | .................. | G06Q 30/0276 705/14.49 |
| 2019/0065985 A1* | 2/2019 | Fieres | ...................... | G06N 3/08 |
| 2019/0182103 A1* | 6/2019 | Pignataro | .............. | H04L 41/147 |
| 2019/0356535 A1* | 11/2019 | Li | ........................ | H04L 41/0631 |
| 2019/0392354 A1* | 12/2019 | Yang | ..................... | G06F 9/5072 |

OTHER PUBLICATIONS

Clemm, et al., "A forecasting system for system event messages", in 2010 IEEE Network Operations and Management Symposium—NOMS 2010, pp. 623-630. (Apr. 2010).

Jaudet, "Neural networks for fault prediction in a telecommunications network", in 8th International Multitopic Conference, 2004. Proceedings of INMIC 2004. pp. 315-320. (Dec. 2004).

Kazmi, et al., "Application of statistical sampling to predict faults from real time alarm data", 2011 IEEE 14th International Multitopic Conference, Karachi, 2011, pp. 290-295. (doi: 10.1109/INMIC.2011.6151490).

Khan, et al., "Learning time-based rules for prediction of alarms from telecom alarm data using ant colony optimization", International Journal of Computer and Information Technology, vol. 03, No. 01, pp. 139-147. (2014).

Klemettinen, et al., "Rule discovery in telecommunication alarm data", Journal of Network and Systems Management, vol. 7, No. 4, pp. 395-423. (1999).

Liu, et al., "Sequential proximitybased clustering for telecommunication network alarm correlation", in Advances in Neural Networks—ISNN 2008, F. Sun, J. Zhang, Y. Tan, J. Cao, and W. Yu, Eds. Berlin, Heidelberg: Springer Berlin Heidelberg, pp. 30-39. (2008).

Meira, "A model for alarm correlation in telecommunications networks", PhD dissertation, Federal University of Minas Gerais, Belo Horizonte, Brazil 47 pages (1997) (https://pdfs.semanticscholar.org/42d6/15ed8baeb198e971b62de3b9e3e62ec0bc51.pdf).

Rouvellou, et al., "Automatic alarm correlation for fault identification", in INFOCOM '95. Fourteenth Annual Joint Conference of the IEEE Computer and Communications Societies. Bringing Information to People. Proceedings. IEEE, vol. 2, pp. 553-561. (Apr. 1995).

Solmaz, "Data analytics for alarm management systems", Ph.D. dissertation, bilkent university, 67 pages. (2017) (http://repository.bilkent.edu.tr/bitstream/handle/11693/32980/10145974.pdf?sequence=1&isAllowed=y).

Sozuer, et al., "new approach for clustering alarm sequences in mobile operators", in NOMS 2016—2016 IEEE/IFIP Network Operations and Management Symposium, pp. 1055-1060 (Apr. 2016).

Weiss, "Predicting telecommunication equipment failures from sequences of network alarms", Handbook of Knowledge Discovery and Data Mining, pp. 891-896. (2002).

Zeng, et al., "Knowledge guided hierarchical multi-label classification over ticket data," IEEE Transactions on Network and Service Management, IEEE Transactions on Network and Service Management, vol. 14, No. 2, pp. 246-260, (Jun. 2017).

* cited by examiner

MANAGEMENT AND CONTROL FOR IP AND FIXED NETWORKING

TECHNICAL FIELD

This disclosure relates generally to managing the operation of a network.

BACKGROUND

Recent advances in fifth generation (5G) communication systems are fueling possibilities of using networks to support autonomous driving, smart healthcare, and other society-critical applications. To support these applications, networks must have enhanced levels of availability and reliability. Any downtime—even very short ones lasting only a few seconds—not only may lead to failed or dropped calls, but also may be a matter of life or death when networks are used for controlling automobiles and supporting real-time healthcare decisions.

In view of these considerations, it is a goal of system designers to ensure that networks perform with enhanced levels of availability, reliability and efficiency, and in a manner that mitigates risks associated with downtime. Achieving this goal may include, for example, preventing network failures whenever possible and employing recovery measures quickly when failures cannot be prevented. Current approaches have proven to be inadequate for these purposes.

SUMMARY

A brief summary of various example embodiments is presented. Some simplifications and omissions may be made in the following summary, which is intended to highlight and introduce some aspects of the various example embodiments, but not to limit the scope of the invention.

Detailed descriptions of example embodiments adequate to allow those of ordinary skill in the art to make and use the inventive concepts will follow in later sections.

In accordance with one or more embodiments, a method for managing alarms in a network includes identifying a first set of alarms based on data in a knowledge base, determining at least one attribute for each alarm in the first set of alarms, generating a model based on the at least one attribute, and applying the model to manage alarms in the network, wherein the at least one attribute includes at least one of a persistence time for one or more alarms in the first set of alarms, an alarm group derived from the first set of alarms, and predictions for alarms in the first set of alarms.

The at least one attribute may be a persistence time for each alarm in the first set of alarms. The persistence time for each alarm may be based on at least one historical time when the alarm was automatically resolved without intervention. The method may include applying an iterative algorithm to determine the persistence time for each alarm in the first set of alarms, the iterative algorithm setting the persistence time based on a balance between time and accuracy of the alarm in relation to a predetermined probability function.

The at least one attribute may be a prediction of when each alarm in the first set of alarms occurs. The method may include generating a second set of alarms based on the first set of alarms, the second set of alarms corresponding to alarms in the first set of alarms that occurred one or more times in a predetermined time window; filtering out alarms from the second set of alarms that do not satisfy a criteria; determining a pattern among remaining alarms in the second set of alarms that were not filtered out; and generating alarm predictions for the remaining alarms in the second set of alarms based on the pattern. Determining the pattern among remaining alarms in the second set of alarms may be performed using a decision-tree algorithm.

The at least one attribute may be an alarm group derived from alarms in the first set of alarms. The method may include identifying alarms in the first set of alarms that originate from a same cause as an alarm in the first set of alarms, for each identified alarm, applying a linear correlation to time series data to determine ones of the identified alarms that arrive together, and generating a group based on the identified alarms that arrive together.

The method may include determining accuracy of the knowledge base and adaptively changing the at least one attribute based on the determined accuracy of the knowledge base. The method may include generating a set of alarms received in real-time from the network, comparing the set of alarms received in real-time to the knowledge base relative to the at least one attribute, the at least one attribute including a first attribute and a second attribute, the first attribute correspond to predicted alarms and the second attribute corresponding to persistence times, maintaining one or more count values based on the comparisons, and modifying the at least one attribute or the knowledge base based on the one or more count values.

Determining the at least one attribute may include determining the persistence time for each alarm in the first set, the alarm group, and the alarm predictions, and the model may be generated based on the persistence time for each alarm in the first set, the alarm group, and the alarm predictions.

In accordance with one or more embodiments, a system for managing alarms in a network includes a storage device configured to store a knowledge base and a processor configured to identify a first set of alarms based on data in a knowledge base, determine at least one attribute for each alarm in the first set of alarms, generate a model based on the at least one attribute, and apply the model to manage alarms in the network, wherein the at least one attribute includes at least one of a persistence time for one or more alarms in the first set of alarms, an alarm group derived from the first set of alarms, and predictions for alarms in the first set of alarms.

The at least one attribute may be a persistence time for each alarm in the first set of alarms. The persistence time for each alarm may be based on at least one historical time when the alarm was automatically resolved without intervention. The processor may be configured to apply an iterative algorithm to determine the persistence time for each alarm in the first set of alarms, the iterative algorithm configured to set the persistence time based on a balance between time and accuracy of the alarm in relation to a predetermined probability function.

The at least one attribute may be a prediction of when each alarm in the first set of alarms occurs. The processor may generate a second set of alarms based on the first set of alarms, the second set of alarms corresponding to alarms in the first set of alarms that occurred one or more times in a predetermined time window; filter out alarms from the second set of alarms that do not satisfy a criteria; determine a pattern among remaining alarms in the second set that were not filtered out; and generate alarm predictions for the remaining alarms in the second set of alarms based on the pattern.

The at least one attribute may be an alarm group derived from alarms in the first set of alarms. The processor may identify alarms in the first set of alarms that originate from a same cause as an alarm in the first set of alarms; for each identified alarm, apply a linear correlation to time series data to determine ones of the identified alarms that arrive together; and generate a group based on the identified alarms that arrive together.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate example embodiments of concepts found in the claims and explain various principles and advantages of those embodiments.

These and other more detailed and specific features are more fully disclosed in the following specification, reference being had to the accompanying drawings, in which.

DETAILED DESCRIPTION

Figure 1:
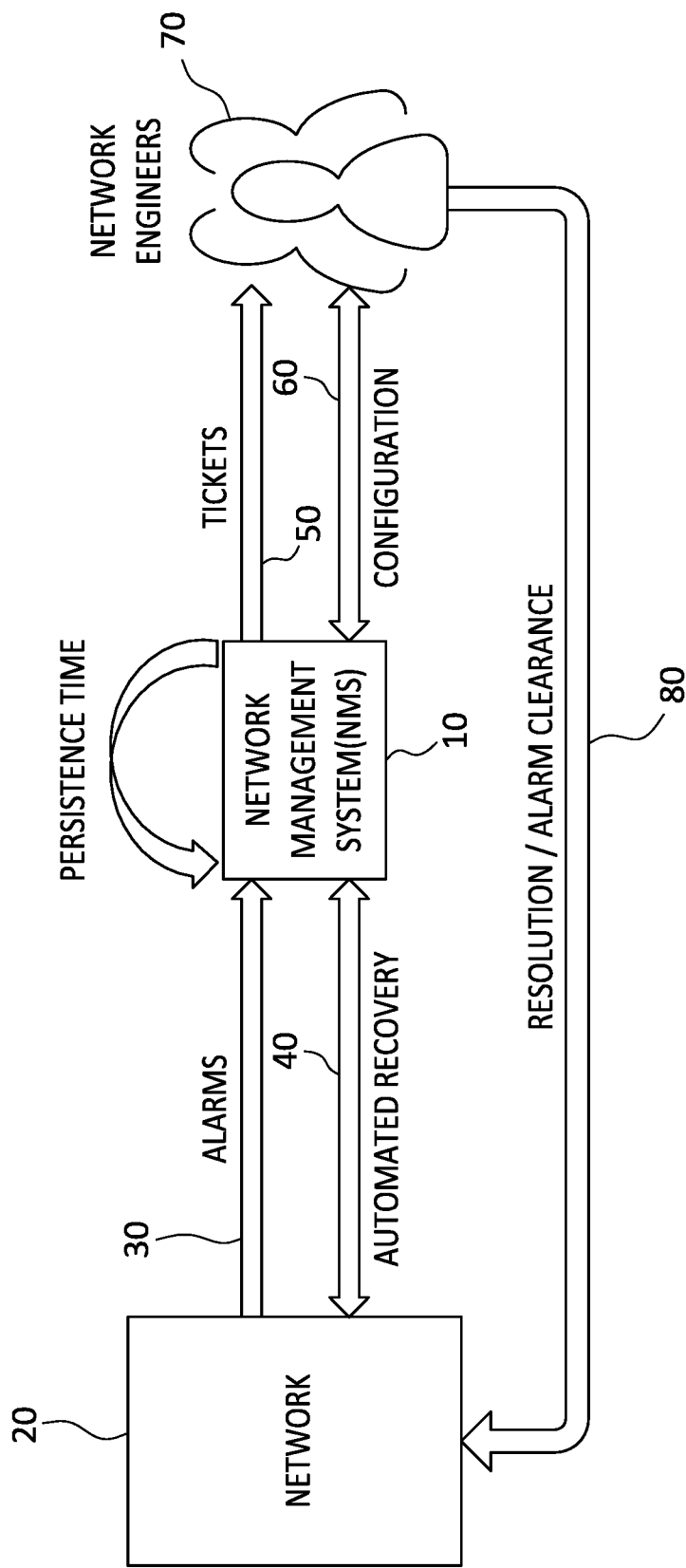
FIG. 1 illustrates an example of a network architecture.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor to furthering the art and are to be construed as being without limitation to such specifically recited examples and conditions. Additionally, the term, "or," as used herein, refers to a non-exclusive or (e.g., and/or), unless otherwise indicated. Also, the various embodiments described herein are not necessarily mutually exclusive, as some embodiments can be combined with one or more other embodiments to form new embodiments. Descriptors such as "first," "second," "third," etc., are not meant to limit the order of elements discussed, are used to distinguish one element from another, and are generally interchangeable.

In order to maintain proper operation, many networks collect a defined set of metrics or logs from constituent nodes and links on a continual basis. The metrics or logs are compared to an expert-defined baseline. When a metric or log is determined to deviate from a baseline, a corresponding alarm may be generated. Embodiments described herein may improve the efficiency of a network by managing alarms using approaches that are based on one or more of persistence times, alarm grouping, and alarm prediction.

FIG. 1 illustrates an example a network architecture including a network management system 10 coupled to a network 20. In this example, the network management system receives alarms 30 from one or more dedicated nodes of the network. When an alarm is received, the network management system 10 waits a defined time (e.g., persistence time) before any corrective action is taken. The persistence time is implemented in case the underlying cause of the alarm resolves itself, which is possible when at least some types of alarms are issued. The optimal use of persistence time, therefore, serves to prevent an unnecessary consumption of network management system 10 and network engineers 70 resources.

If the alarm persists beyond the persistence time, the network management system 10 may implement recovery measures to resolve or clear the alarm. The recovery measures 80 may be automatically performed 40 or a ticket 50 may be generated to initiate action by one or more network engineers 70. The engineers may correct the cause of the alarm, for example, based on inputting configuration 60 and/or other information to the network management system or node. When the problem is resolved, the engineers may clear the alarm.

In accordance with one or more embodiments, efforts are taken to automatically control persistence times, alarm grouping, alarm prediction, and/or other attributes of the network relating to alarm management and resolution. For example, control of persistence time may involve setting an optimal persistence time for each alarm. This may be beneficial because a lower-than-optimal value may generate too many alarms (that would be unnecessarily acted on and thus increase load on human and network resources) and a higher-than-normal value may increase the use of storage resources (e.g., would require storing a large number of alarms in memory before processing) and potentially degrade quality of service in the case of critical alarms, which, in turn, leads to downtime.

The network management system may also automatically group alarms based on pre-defined rules. For example, whenever one alarm in a group of alarms is received, the rules may take preemptive action which precludes having to wait for the occurrence of all other alarms in the group before recovery measures are taken. In addition, alarms may be predicted and corrective measures taken before the alarms actually occur.

In accordance with these or other embodiments, a system and method is therefore provided to determine and adapt persistence times, alarm groupings, and/or alarm predictions in association with one or more networks or services. The system and method may be implemented in at least one of two phases: a generation phase and an adaptation phase. The generation phase includes obtaining a first set of arrival times and a first set of clearance times for one or more selected alarms, determining persistence time(s) for the alarm(s) based on the clearance and arrival times, determining a first set of alarms that arrive within a defined time window of each of the times in the set of arrival times, predicting that the alarm will be triggered based on the temporal characteristics of the first set of alarms, determining a second set of alarms which arrive within a defined time window of the alarm, and predicting that all alarms in the second set of alarms will be triggered.

The adaptation phase may include obtaining a third set of alarms along with sets of arrival times and a sets of clearance times for each alarm, automatically evaluating accuracies of the generated persistence times, alarm groupings, and/or alarm predictions, and automatically adapting the persistence times, alarm grouping, and/or alarm predictions when the determined accuracies fall below set thresholds. The operations in the generation and adaptation phases may be performed, in whole or part, by a network management system, one or more network nodes, and/or another network device executing instructions of a computer program which causes a processor to perform operations according to the embodiments described herein.

In accordance with one or more embodiments, the persistence time for each alarm may be automatically determined instead of manually determined as is the current practice. In addition, a first group of alarms may be predicted to occur at a given time before the alarm is triggered. At the time of prediction, each predicted alarm may be associated with an alarm type, the affected network element, and the physical location of the network element. Moreover, a second group of alarms may be established, which, if triggered in a defined order and at defined times, trigger the first group of alarms. In such a case, the sequence of the second group of alarms may be evaluated and graphically presented as possible root causes for alarms in the first group. In one embodiment, the predictions may be carried out by a system that is initially trained using a machine learning technique, and a model obtained, which may be adapted to changing network conditions (including topology) as new sets of alarms are issued in real time. The persistence times, alarm prediction, alarm grouping, and other managed attributes may ensure the optimal use of alarm resolution resources, both human and computational.

Generation Phase

Figure 2:
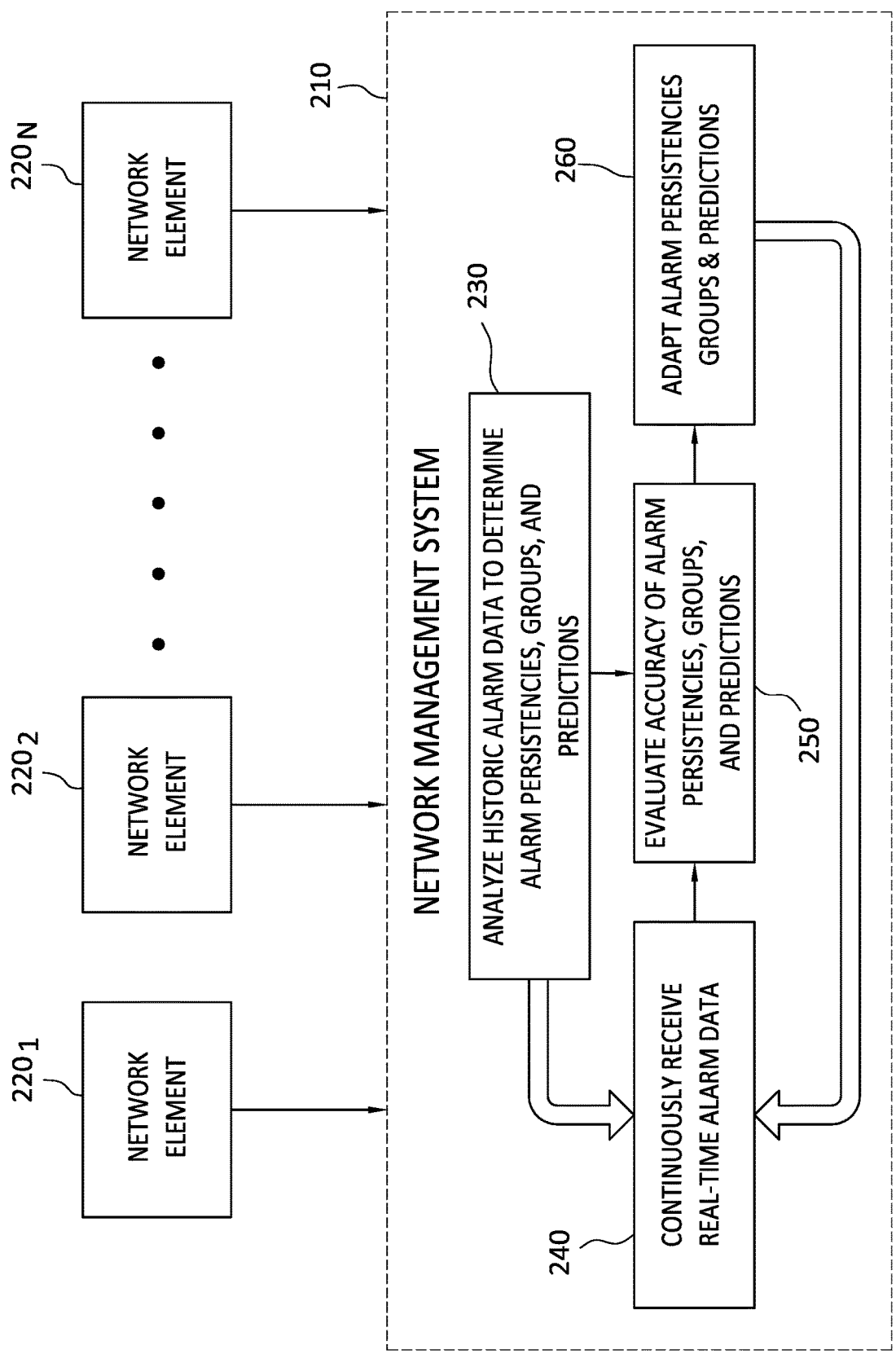
FIG. 2 illustrates an embodiment of a method for managing alarms in a network.
Figure 3:
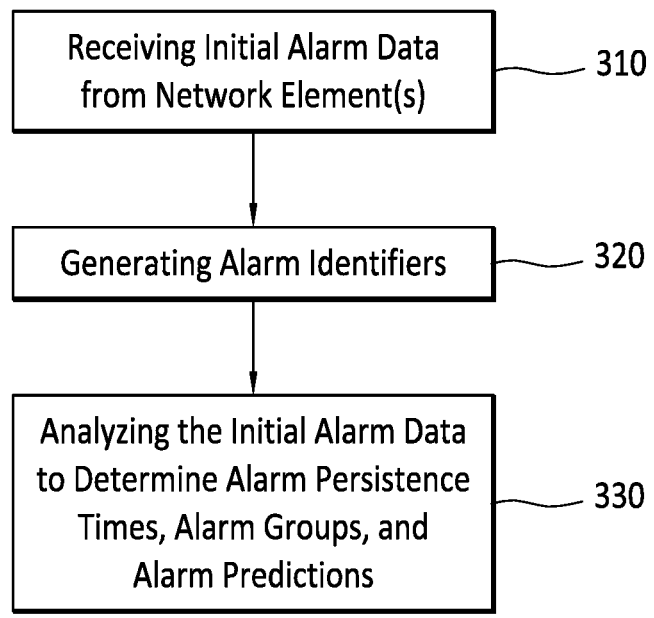
FIG. 3 illustrates an embodiment of a method for generating alarm attributes.

FIG. 2 illustrates process flow corresponding to an embodiment of a method for managing alarms in a network. The method may be implemented using a generation phase, either alone or in association with an adaptation phase. FIG. 3 illustrates an embodiment of operations which may be included in the process flow of the method of FIG. 2.

Referring to FIGS. 2 and 3, the method includes, at 310, receiving an initial set of alarm data for the network. The initial set of alarm data may be received by a network management system 210 from one or more network elements $220_1$, $220_2$, . . . $220_N$. The network management system 210 may store the alarm data in a database, which may or may not be accessible by the network elements that submitted the alarm data and/or one or more other network elements. The initial set of alarm data may include a history of alarm data 230 that has been collected or otherwise defined for the network. This history of this alarm data may be processed to form the initial state of a knowledge base (described below) for managing alarms in the network.

The network elements $220_1$, $220_2$, . . . $220_N$ may also include one or more network nodes and/or another device included in or coupled to the network. In one embodiment, one of the network elements may correspond to the network management system 210. The network element(s) generating the alarm data may correspond to one or more layers (e.g. physical layer, network layer, application layer, etc.) of a communication protocol stack, may implement different communication network standards (e.g., 3G, 4G, 5G, etc.) and/or different technologies (e.g., software-defined network (SDN), network functions virtualization (NFV), cloud computing, etc.). The network elements may all be included in a same network or may be in different networks that communicate with one another.

At 320, the initial set of alarm data is analyzed to define the alarms that are to be managed in the network. In one embodiment, alarms may correspond to abnormal values of one or more metrics or logs that are detected by or otherwise derived from one or more of the network elements $220_1$, $220_2$, . . . $220_N$. The alarms may be only ones that are expected to reoccur in the network or may correspond to all possible alarms that may occur in the network. In another embodiment, the alarms may be pre-selected based on programming and/or input information selecting specific ones of the alarms to be managed.

The alarms may be classified or defined, for example, based on type, affected network element, and/or location of the network element. In one embodiment, the alarms may be defined by or presented with one or more accompanying parameters. Examples of these parameters include time of trigger T, time of clearance C, mode of clearance M (indicating whether an alarm cleared without intervention or not), identification I (which is representative of a key performance indicator (KPI), a metric, or a log that has been violated), the network element N to which the alarm relates, and the geographical location L of N. In one embodiment, an alarm A may be uniquely identified by the following 3-tuple: A(I, N, L). Different instances of alarm identifiers A(I, N, L) may have different values of T, C and M, where M may be a binary value of 1 representing alarms which have resolved without intervention or 0 otherwise. While this 3-tuple may be beneficial for some embodiments, alarms may be defined based on one or more other combinations of parameters in other embodiments.

A number of pre-processing operations may be performed to generate the unique identifier A(I, N, L) for each alarm. These operations may differ, for example, based on the particular aspects of the network or network management system. For example, while the time T may always be available for every triggered alarm, in some cases the clearance time C may only be determined after the alarm has been cleared. Examples of pre-processing operations may include but are not limited to: (1) identifying alarms which clear automatically within their persistence time, (2) selecting only a subset of alarms (e.g., based on severity, network operator, etc.), (3) removing duplicate instances of the same alarm (e.g., by considering that all alarms with the same values of I, N, and L and almost the same value of T relate to the same problem), and (4) counting and generating time-series representations of a given alarm.

At 330, once the alarms have been defined, model for managing alarms in the network is generated based on the initial set of alarm data 230. In one embodiment, the model may be generated to have a plurality of sub-models, where each sub-model is defined for a respective one of the following attributes: Alarm Persistence Times, Alarm Groups, and/or Alarm Predictions. Initial values of these attributes (and/or other alarm data) may be stored in a knowledge base 240, which may be updated, periodically or continuously, for purposes adapting the model 260 to the current state of the network. The model (and its sub-models) may be implemented by one or more neural networks, machine-learning algorithms, and/or optimization techniques to automatically, dynamically, and adaptively determine optimal values for managing alarms of an applied network application. Generation of the model may be performed in accordance with the following operations.

For each persistence time, alarm group, and alarm prediction, the knowledge base may store a number of characteristics. These characteristics may include an accuracy or confidence key parameter indicator (KPI) 250, which may be used for adaptively changing the persistence times, alarm groups, and/or alarm predictions in the adaptation phase. KPI may be a measure of accuracy of the knowledge base as evaluated using part of the initial alarm set. The knowledge base may then be used in a real-time system to: (1) determine the time between arrival of a given alarm and initiation of resolution of that alarm, (2) group alarms, and (3) predict future alarms.

In a real-time application of the system and method embodiments, alarms may continuously arrive at the network management system. At defined intervals, each received alarm may then be compared against the existing knowledge base, and the accuracy of the persistence times, alarm groups, and alarm predictions may be updated. When the accuracy of an entry in the knowledge base falls below a corresponding predetermined threshold, an adaptation operation may be performed for that entry using a set of the most recent alarms, as described in greater detail below.

Persistence Times

Figure 4:
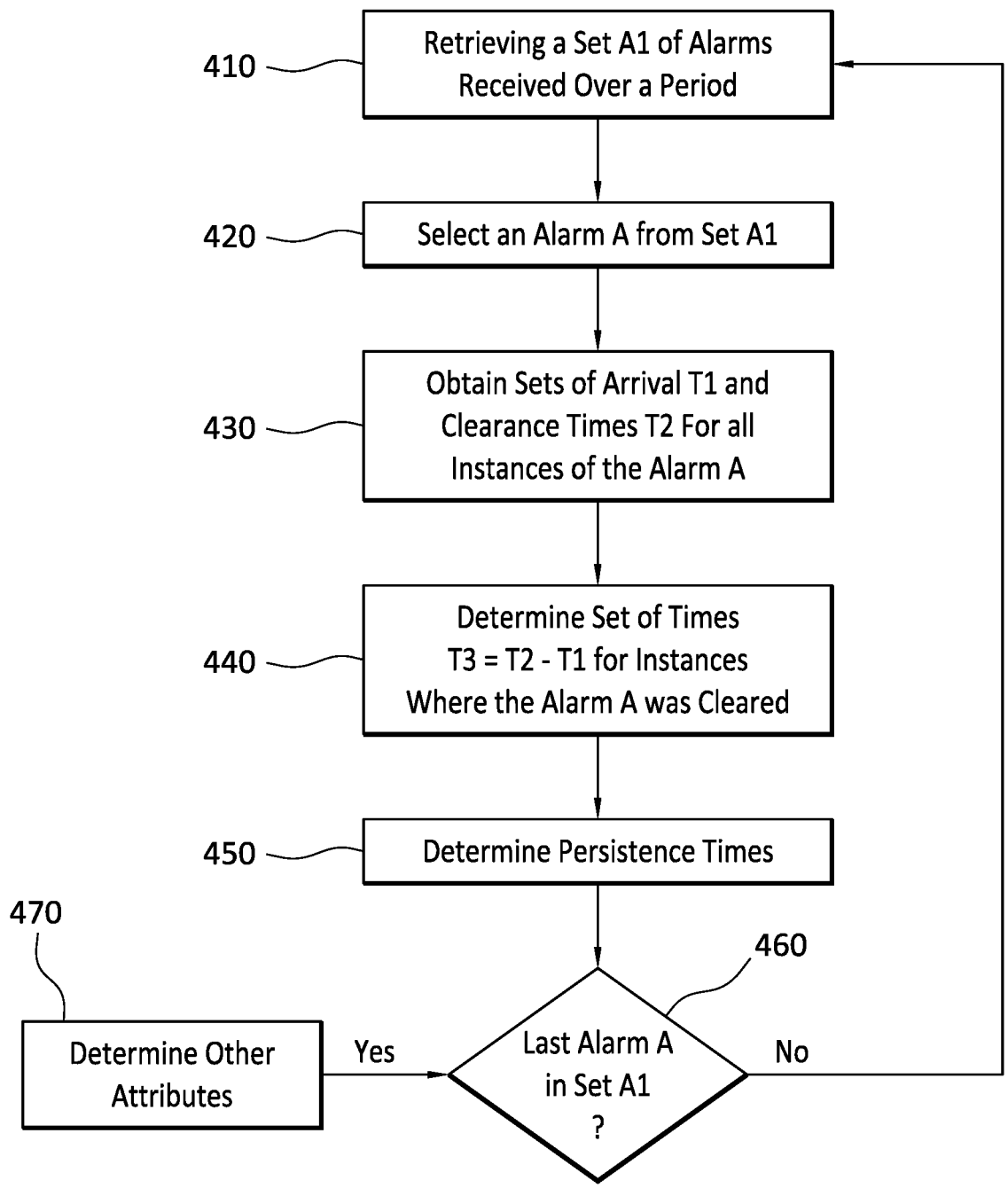
FIG. 4 illustrates an embodiment of a method for generating persistence times.

FIG. 4 illustrates an embodiment of a method for determining alarm persistence times in accordance with operation 330 in FIG. 3. Referring to FIG. 4, the method includes, at 410, retrieving from the knowledge base a set A1 of (all or a pre-defined subset of) alarms received during a predetermined period of time. The alarms in set A1 may be selected one at a time for purposes of determining persistence times for the alarms. This may involve, at 420, selecting a first one of the alarms $A_1(I, N, L)$ from the A1 set. At 430, two sets are then generated. The first set corresponds to all times T1 when the selected alarm $A_1(I, N, L)$ arrived or was otherwise triggered during the period. The second set corresponds to times T2 the selected alarm $A_1(I, N, L)$ was cleared/resolved. At 440, a third set of times T3 is determined for instances where the selected alarm $A_1(I, N, L)$ was cleared without intervention. The times in set T3 may be based on a differences between the times in set T2 and corresponding ones of the times in set T1, e.g., T3=T2−T1. All of the times T1, T2, and T3 may be stored in the knowledge base or a database. At 450, a persistence time for the alarm $A_1(I, N, L)$ from the A1 set is determined. In one embodiment, set A1 may include only one alarm.

When there is more than one alarm in set A1, operations 410 to 450 are performed for remaining ones of the alarms (e.g., $A_2(I, N, L)$ to $A_x(I, N, L)$) in the first set A1, where X>2. Thus, at 460, a check is performed to determine whether the next alarm selected from set A1 is the last alarm in this set. If not, the method selects another alarm $A_2$ from set A1 and repeats the operations for this next-selected alarm. If the currently selected alarm is the last alarm in the set A1, then, at 470, additional attributes based on the initial set of alarm data may be obtained or the model may perform alarm management based on only this attribute. In one embodiment, where the model is implemented with multiple attributes, the attributes may be determined in parallel with the persistence time attribute.

The persistence time for an alarm A may correspond to the amount of time that passes until action is taken to resolve the alarm. This amount of time is instituted in order to delay resolution of the alarm, e.g., to correct its underlying cause. This delay time, thus, gives the system or network a chance to resolve or clear itself. If the alarm persists beyond the delay (or wait) time, then action to resolve the alarm may be taken. The persistence time, therefore, may be used to prevent the unnecessary expenditure of resources in attempting to resolve or clear an alarm, e.g., if the cause of the alarm automatically resolves itself (without intervention, by a human or processing logic) within a wait period of time, then there is no need to allocate resources to resolve the problem. The use of persistence times may therefore improve the operational efficiency of the network.

For operation 450, determining the persistence time P3 for each alarm A in set A1 may involve determining the optimal persistence time for that particular alarm. The optimal values of the persistence times P3 for the alarms in set A1 is determined based on respective times in set T3 (as calculated in operation 440) for respective ones of the alarms.

In one embodiment, the optimal values for the persistence times P3 may be determined based on a balancing act between accuracy and time. High accuracy may imply that persistence time P3 of an alarm A is sufficiently large to cover all possible automatically cleared instances of the alarm. A number of approaches may be used for this purpose, including but not limited to using the lowest value, highest value, average of the example values of persistence times. However, none of these approaches provides an optimal value because the times to automatically clear the alarms widely vary. One or more embodiments described herein may generate optimal values using an iterative algorithm.

Figure 5:
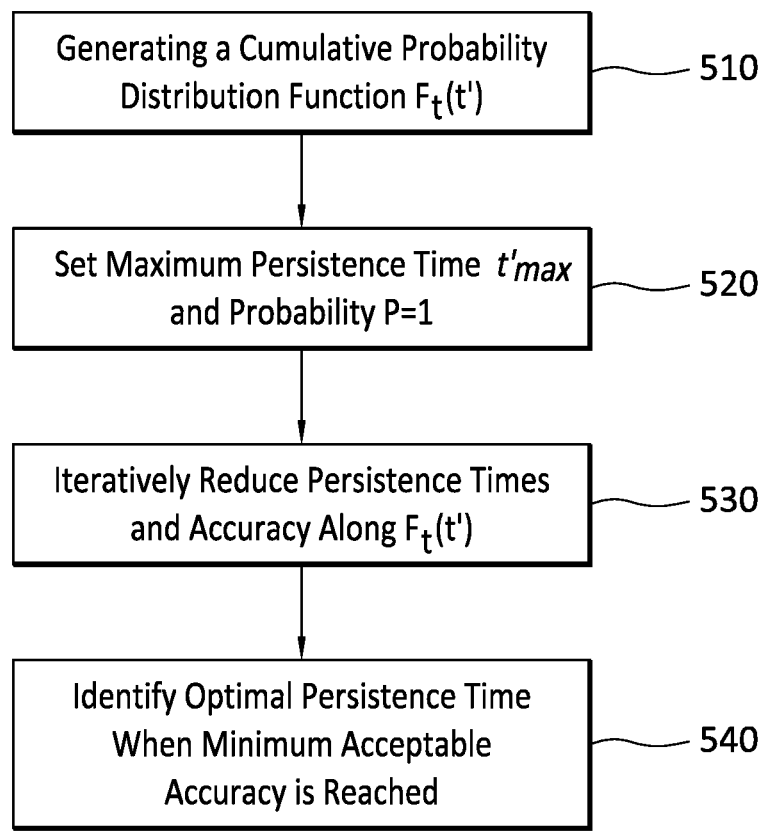
FIG. 5 illustrates an embodiment of a method for determining optimal persistence times.
Figure 6:
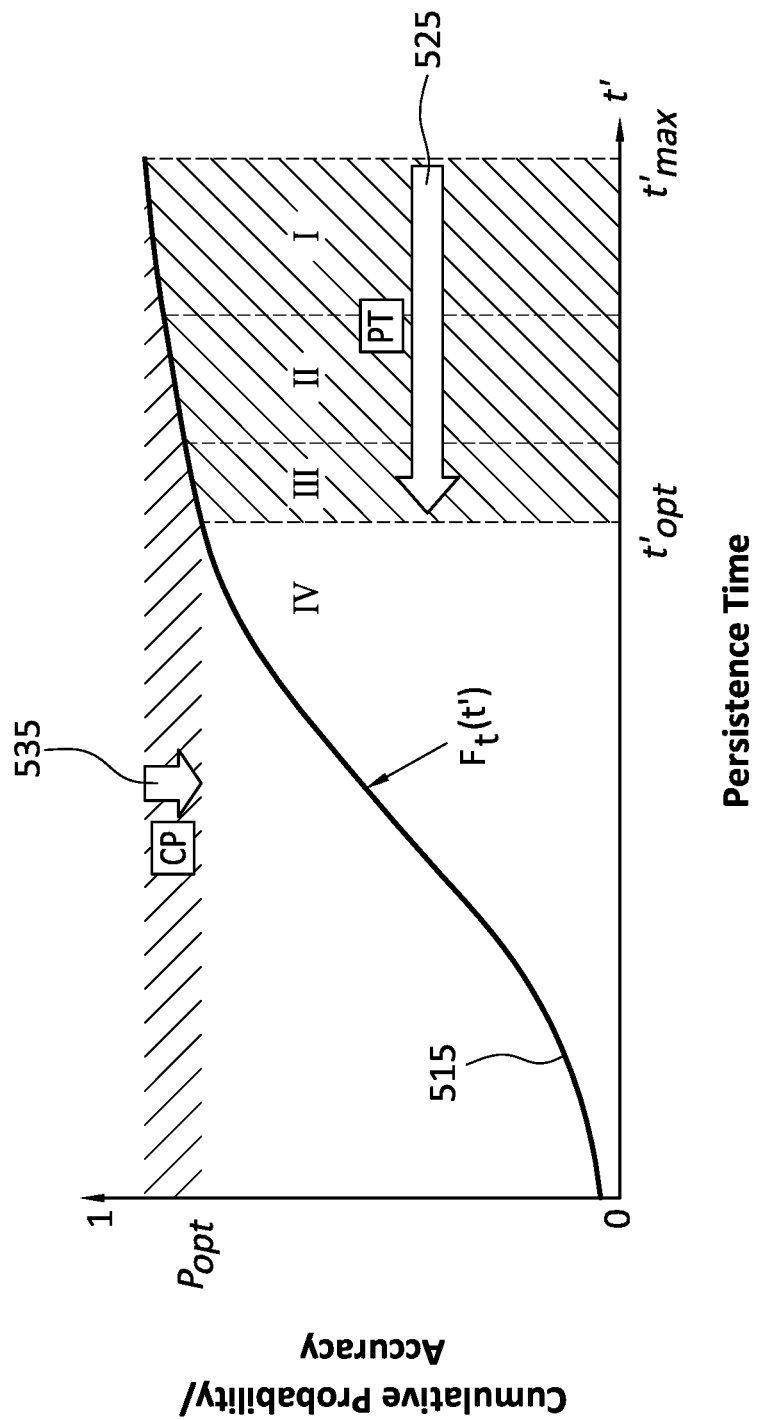
FIG. 6 illustrates an example of a plot for determining optimal persistence times.

FIG. 5 illustrates an embodiment of a method for iteratively determining optimal values for persistence times P3 for the alarms in set A1. FIG. 6 illustrates a plot that may represent an embodiment of the iterative approach for determining optimal values of the persistence times P3. In FIG. 6, the persistence times are indicated by symbol PT in the plot.

Referring to FIGS. 5 and 6, accuracy is iteratively traded for time in accordance with operations that include, at 510, generating a cumulative probability distribution function ($F_t(t')$) 515 using all the values of persistent times P3 in the third set T3. This function indicates the probability that a given persistence time t of an instance of alarm A in set A1 will take a value less than or equal to t'. The objective is then to determine the optimal value $t'_{opt}$.

At 520, time $t'_{max}$ is set as the maximum value of persistence times P3 in set T3. In one embodiment, the value of time $t'_{max}$ corresponds to the probability distribution function $F_t(t'_{max})=1$ indicating the highest possible accuracy. Because accuracy is highest at $F_t(t'_{max})=1$, all persistence times T3 calculated from the history of persistence times in the initial data set will be below persistence time $t'_{max}$.

At 530, at this point, the probability or accuracy (on the vertical axis) is iteratively traded for time, as indicated by the direction of the arrows in FIG. 6. This is accomplished, for example, by reducing the persistence time (on the horizontal axis) in the direction of arrow 525 from the maximum time value $t'_{max}$ (in the left direction of the arrow)

on a continuous or incremental manner, using a pre-defined reduction ratio, e.g. 5%. Reducing the persistence time in this manner produces corresponding lower values of accuracy (or probability) P in the direction of arrow 535, as indicated by the dotted line relative to the probability distribution curve $F_t(t')$.

At 540, after every pre-defined reduction in time, the corresponding percentage reduction in accuracy is determined. The accuracy (or probability values) CP will continue to be decreased until the resulting percentage decrease in accuracy is higher than a predetermined threshold. At this point, $p_{opt}$, the process stops, and the persistence time corresponding to $p_{opt}$ may be identified as the optimal persistence time $t'_{opt}$ given an acceptable level of trade-off in accuracy set by the predetermined threshold accuracy $p_{ops}$.

As an example of this process, the times in set T3 may be placed in equally sized Bins I, II, III, and IV. The value of the probability distribution curve $F_t(t')$ for the maximum value in each bin may then be determined using the plot of FIG. 6. Then, starting with Bin I with the highest value of $F_t(t')$, the Bin II with the next lower values is gradually selected, while determining the percentage change in the values of $F_t(t')$. The process then continues to Bins III and IV, while the percentage change in the values of $F_t(t')$ is determined. The process stops when the percentage loss in accuracy exceeds a predetermined threshold, corresponding to optimal accuracy (or probability) value $P_{opt}$. At this time, the limit value ($t'_{opt}$) (see dotted line) in the previous bin may be used as the optimal persistence time for that alarm A in set A1.

Alarm Predictions

The occurrence of alarms may be predicted before the alarms are actually triggered. This may serve as a basis for reducing the time between alarm triggering and resolution, in addition to generating optimized persistence times.

Figure 7:
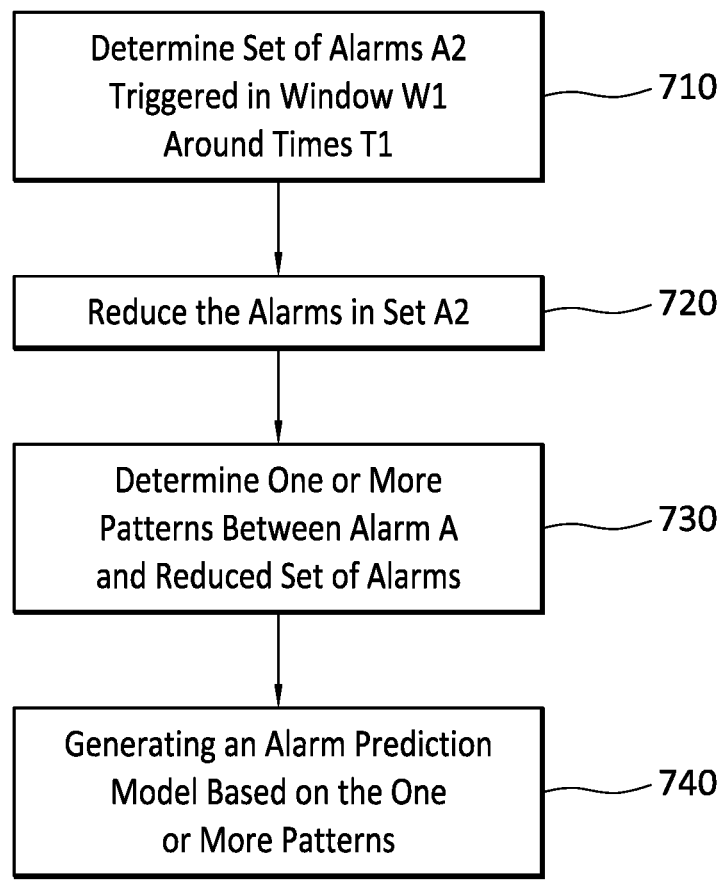
FIG. 7 illustrates an embodiment of a method for determining alarm predictions.

FIG. 7 illustrates an embodiment of a method for determining alarm predictions in accordance with operation 330 in FIG. 3. At 710, after alarm set A1 is determined, for any given example alarm A, a set A2 of alarms is determined for alarms that occurred or were triggered at least once within a time window (W1) around (e.g., before or after) the times in set T1. The time window may be, for example, a time period of a predetermined duration such 15 minutes. The set of alarms A2 may be considered to be a candidate set of alarms to be analyzed for cause or correlation with A.

At 720, the alarms in set A2 are filtered (e.g., reduced or pruned) such that only those alarms in set A2 that satisfy a predetermined correlation criteria are retained. As an example criteria, it can be enforced that only those alarms that appear in at least 70% of all the time windows under consideration will be retained. Reducing the number of alarms to be evaluated is important to enhance the computation speed of the pattern generation step 734.

At 730, one or more relationships (or patterns) between the reduced subset of alarms in set A2 and alarm A are determined. Various types of machine-learning algorithms may be used to determine these relationships or patterns. Examples of these algorithms include but are not limited to, sequence pattern mining, frequent pattern mining, artificial neural networks, decision trees, etc. As an example, pattern generation (and hence prediction) may be formulated as a binary classification problem, in which decision trees are used to identify combinations of occurrences (or not) of alarms in set A2 that are more likely to result in the occurrence of alarm A. (Here, alarm A may be an example of an alarm selected from set A1. The process of prediction may be carried out for each alarm). Such combinations may be represented as groups of rules which make up the branches and leaves of a decision tree.

To formulate the decision tree, the right input data is prepared to input into the decision tree algorithm. An example alarm count dataset shown in Table 1 may be used to illustrate this (input data creation) operation. The data in Table 1 includes counts of the numbers of alarms for alarms A, B, and C received during each of seven time windows, $\tau-3, \tau-2, \ldots, \tau+3$. Each time window may represent, for example, one day, one hour, or another period of time.

TABLE 1

| | $\tau - 3$ | $\tau - 2$ | $\tau - 1$ | $\tau$ | $\tau + 1$ | $\tau + 2$ | $\tau + 3$ |
|---|---|---|---|---|---|---|---|
| A | 0 | 1 | 3 | 2 | 1 | 0 | 1 |
| B | 2 | 3 | 0 | 1 | 0 | 1 | 2 |
| C | 0 | 0 | 1 | 2 | 1 | 2 | 5 |

In order to predict the value of alarm A in a proceeding window, all occurrences of A, B, and C may be used in the previous 2 windows. This means that values in columns ($\tau-3$) and ($\tau-2$) serve as inputs for an output in column ($\tau-1$), columns ($\tau$) and ($\tau+1$) serve as inputs for an output in column ($\tau+2$), etc. The resulting input/output data matrix for the alarm counts is set forth Table 2. The size and location of the previous and proceeding periods may be configurable parameters.

TABLE 2

| A | | B | | C | | OUTPUT |
|---|---|---|---|---|---|---|
| 0 | 1 | 2 | 3 | 0 | 0 | 3 |
| 1 | 3 | 3 | 0 | 0 | 1 | 2 |
| 3 | 2 | 0 | 1 | 1 | 2 | 1 |
| 2 | 1 | 1 | 0 | 2 | 1 | 0 |
| 1 | 0 | 0 | 1 | 1 | 2 | 1 |

With the input dataset created, the decision tree recursively partitions the space such that samples with the same labels are grouped together, until either no more partitions can be created or a stopping condition is reached. For this purpose, a number of decision tree algorithms (e.g., Classification and Regression Trees (CART)) may be applied. The output of the decision tree is a model of alarm patterns, which, in one case, may essentially be a set of if-else-then rules or patterns that may be used to predict when alarm A may be triggered in the network. In one embodiment, a graphical representation of the model may be provided to allow for visualization in helping root cause analysis.

At 740, the method includes generating alarm predictions for remaining alarms in the filtered-out, second set of alarms based on the pattern(s) determined in operation 734. This involves, at any point, checking if any of the if-else-then rules in the patterns has been satisfied by alarm arrivals, and then predicting that the alarm specified in the 'then' part of the rule will be triggered.

Alarm Grouping

Figure 8:
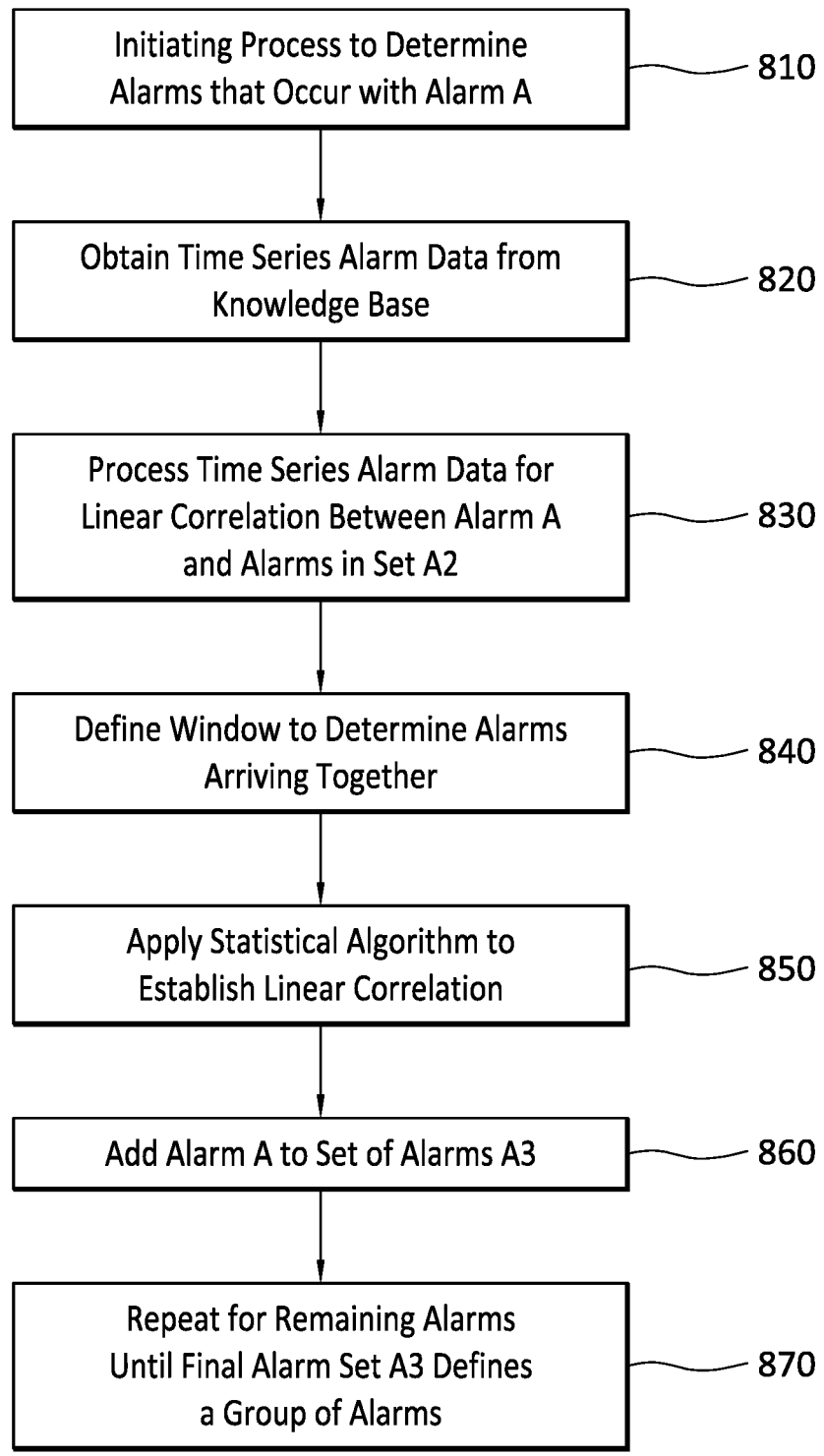
FIG. 8 illustrates an embodiment of a method for determining alarm group(s)

FIG. 8 illustrates an embodiment of a method for grouping alarms in accordance with operation 334 in FIG. 3. In performing this method, the objective is to determine, for any given alarm A, all the other alarms in A1 that can be considered to always be triggered at the same time.

Referring to FIG. 8, the method includes, at 810, initiating a process to determine alarms considered to originate from the same cause as alarm A, e.g., ones that are expected to occur together with some predetermined probability. In order to determine these alarms, at 820, time series data (such as in Table 1) may be retrieved from a knowledge base. At 830, the time series data is processed to determine a linear correlation between alarm A in the first set of alarms and each of the alarms in set A2. This may involve, at 840, defining a time window W2 (where W2<W1) used to determine alarms that arrive together. For example, if W2=15s, then Table 1 would be created for alarm counts every 15s. This means that for any alarms to be grouped together, the alarms must always arrive within 15s of each other. At 850, apply one or more statistical algorithms to perform the linear correlation. One example of such a statistical algorithm is the Pearson product-moment correlation coefficient (PPMCC). At 860, an alarm is added to a set of alarms A3 when the PPMCC between such an alarm and alarm A is greater than a predetermined threshold. At 870, when all iterations are performed for the alarms in set A2, a final set of alarms A3 is produced which defines a group of alarms that may be used as a basis for managing alarms in the network. (Here, grouping and prediction may be performed for a defined alarm A, selected from set A1, for example, in a manner similar to the process that was performed for determining the persistence time).

Figure 9:
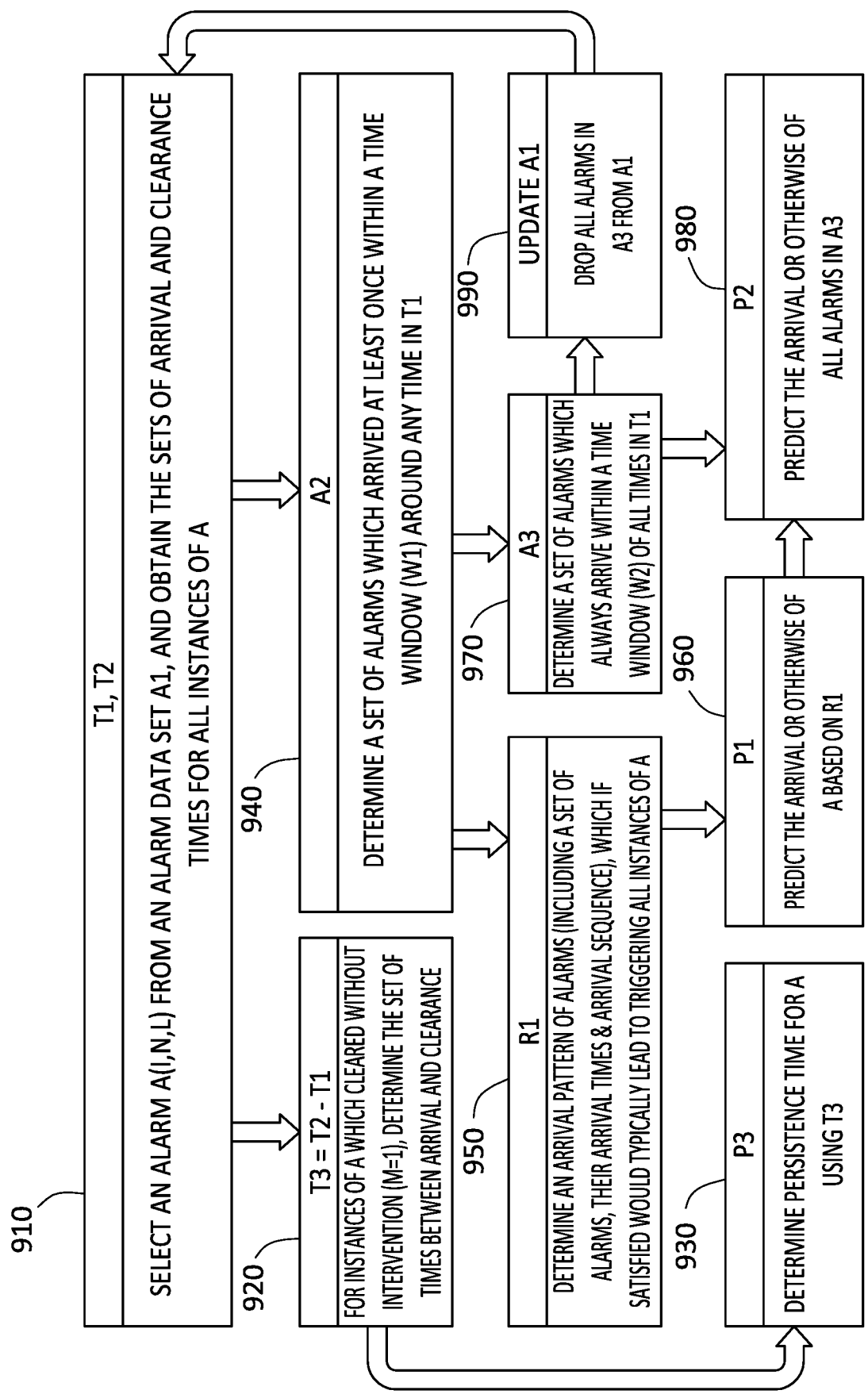
FIG. 9 illustrates an embodiment summarizing one or more of the method embodiments for generating alarm attributes.

FIG. 9 illustrates an embodiment of a flow diagram that summarizes one way in which the aforementioned methods may be implemented to generate the alarm attributes of persistence time, alarm group, and alarm predictions. In this embodiment, the attributes are determined based on a parallel scheme, where all or portions of the operations for generating the attributes are performed at the same time (e.g., in parallel) by one or more processors of a network management system, network node, or another device included in or coupled to the network.

At 910, alarms indicated by information stored in a knowledge base are selected for management. The selected alarms may be, for example, ones that occur more than once during a predetermined period. In another embodiment, the alarms may be selected based on another criterion. Once the alarms are selected, they are classified into a first set A1 of alarms. The alarms in the first set may be given identifiers (e.g., A(I, N, L) at this time. The alarms in the first set A1 are then sequentially selected (or selected in a predetermined order), and sets of arrival times and clearance times T1 and T2 are determined for all instances of the alarms in a predetermined time period.

At 920, times T3 are generated that correspond to ones which were automatically resolved (without intervention) within a certain period of time. The times T3 are generated based on differences in arrival and clearance times in sets T1 and T2 for corresponding ones of the alarms in set A1.

At 930, the persistence times for the alarms in set A1 is determined based on the times T3. The persistence time for each alarm in set A1 may be determined, for example, using the iterative algorithm previously described, which involves a trade-off between accuracy and time based on a predetermined probability distribution curve.

At 940, an operation is performed to determine a set A2 of alarms from the first set A1 which arrived at least once within a predetermined time window W1 around any time in T1.

At 950, an arrival pattern R1 of alarms are determined which, if satisfied, are expected to lead to triggering all instances of each alarm A in the set A2 of alarms. The arrival pattern of alarms includes a set of alarms, their arrival times, and their arrival sequences.

At 960, alarms in the set of alarms A2 generated in operation 950 may be predicted based on the arrival pattern R1.

At 970, a set of alarms is determined from the first set A1 of alarms which always arrive within a time window (W2) of all times of the set of times T1

At 980, an operation is performed to predict the arrival or otherwise all alarms in a third set A3 of alarms, which have been grouped together as previously described.

At 990, the first set A1 of alarms may be updated in accordance with the adaptation phase of one or more embodiments, as described below.

Adaptation Phase

The aforementioned embodiments are used to generate one or more models for managing alarms in a network. Once the model has been created, the model may be adapted on a continuous or periodic basis as more alarm data is generated, in order to improve the efficiency of alarm management. Adaptation of the model may include adjusting one or more of the alarm persistence times, alarm groups, and alarm predictions, as stored, for example, in the knowledge base.

Figure 10:
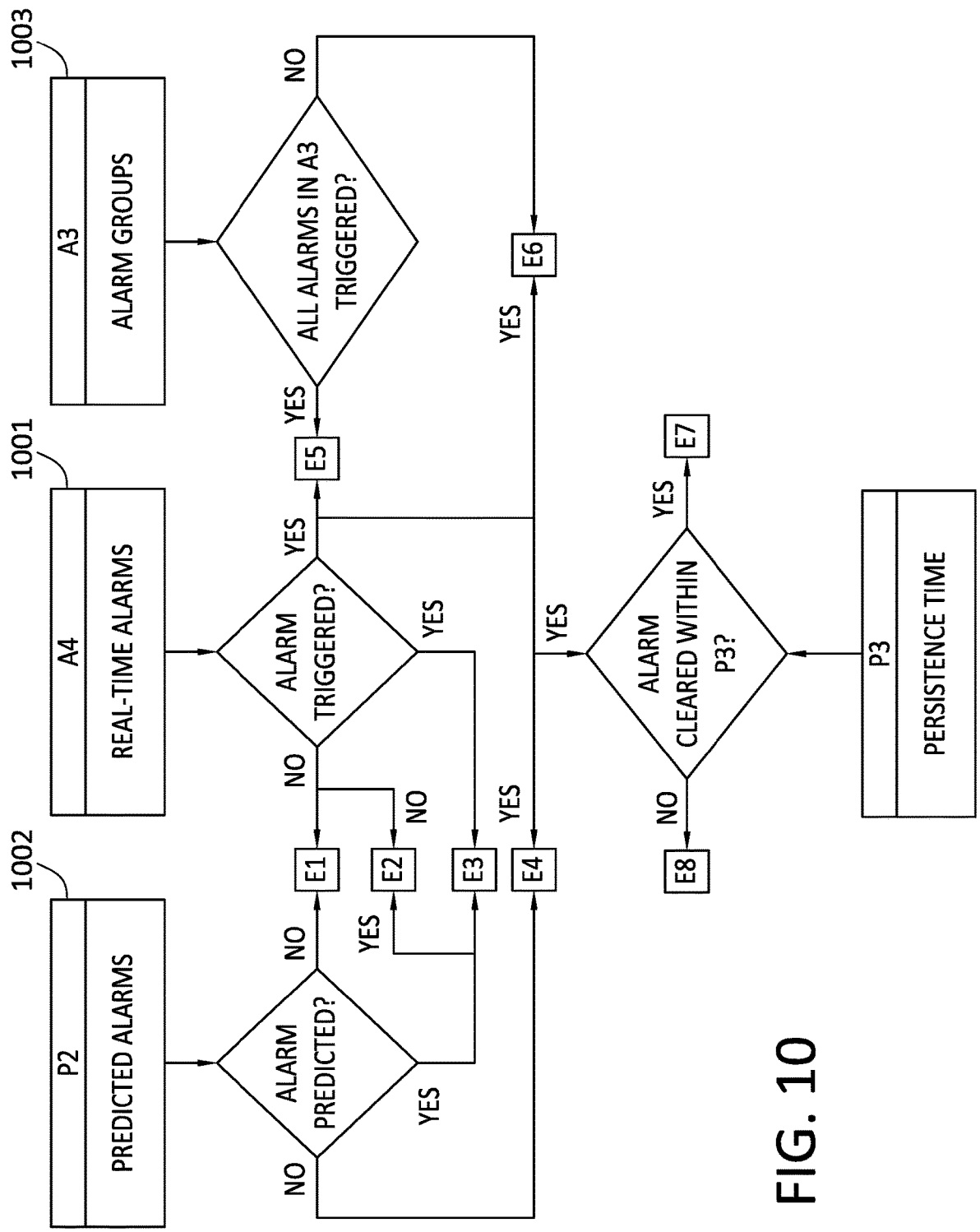
FIG. 10 illustrates an embodiment of a method for determining the accuracy of the knowledge base and/or its alarm attributes.

FIG. 10 illustrates an embodiment for adapting alarm predictions P2 and alarm groups A3 based on a fourth set of alarms A4 that have actually occurred (e.g., real-time alarms), in comparison to the ones which had been predicted.

Referring to FIG. 10, the method includes determining the accuracy of the model generated based on the knowledge base and the attributes (persistence times, alarm predictions, and/or alarm groups) generated using the knowledge base. This involves, for example, using a new set A4 of alarms (labeled 1001). At the initiation of the system, alarm set A4 is selected from the set of alarms A1. This may be accomplished using a data-splitting approach, where available data is split into a training and testing set. Once the system has been deployed, A4 is generated to correspond to the set A4 of alarms received in real-time from the network.

The alarm set A4 is then compared against the knowledge base, for example, based on alarm predictions P2 (labeled 1002) and group of alarms A3 (labeled 1003). For alarm predictions, the comparison may be based on determining whether a positive prediction is followed by actual alarm trigger (E3) or not (E2) or whether a negative prediction is followed by an actual trigger (E4) or not (E1). Therefore, for each evaluated alarm in set A4, the applicable value of E1, E2, E3, or E4 may be incremented.

A measure of prediction accuracy (PA) for the prediction may then be determined using measures such as classification accuracy. Classification accuracy may be determined, for example, based on Equation 1 or similar measures such as precision.

$$PA = (E1 + E3)/(E1 + E2 + E3 + E4) \quad (1)$$

In a similar way, accuracy of the alarm groups may be evaluated by determining whether triggering of any alarm in set A3 is followed by triggering of all alarms in set A3 within the time window W2 (E5) or not (E6). For each triggered alarm in set A3, appropriate value of E5 and E6 may be incremented. A measure of the grouping accuracy (GA) may be determined based on Equation (2).

$$GA = E5/(E5 + E6) \quad (2)$$

Finally, the persistence time accuracy (TA) may be determined by establishing whether a triggered alarm automatically clears (e.g., without intervention) within the time P3 (E7) or not (E8). Therefore, for each non-persistent alarm, E7 or E8 is incremented by 1 and the value of the persistence time accuracy TX may be determined based on Equation (3).

$$TA=(E7)/(E7+E8) \qquad (3)$$

Adaptation Timing

Figure 11:
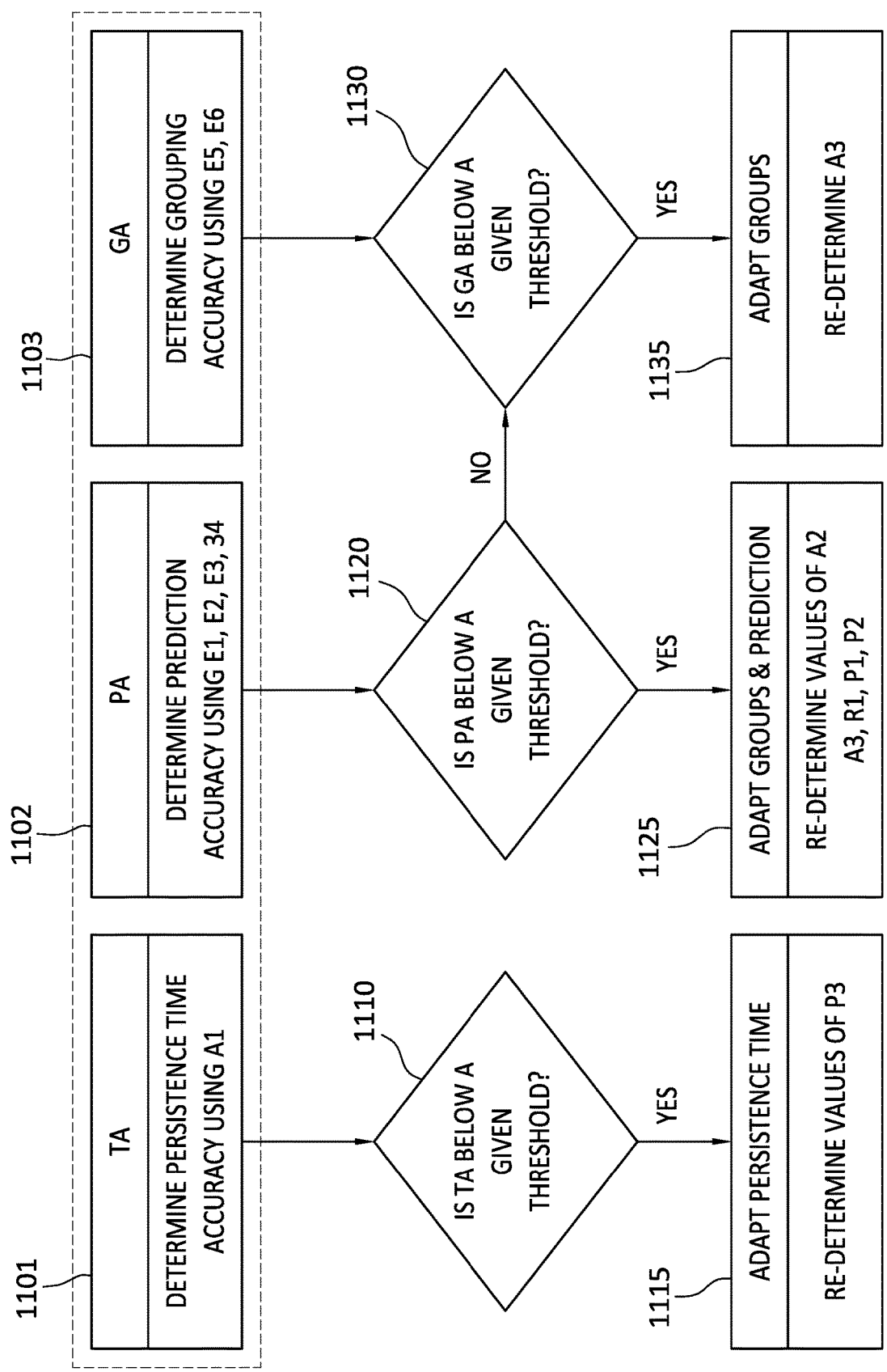
FIG. 11 illustrates an embodiment of a method for performing an adaptation phase.

FIG. 11 illustrates an embodiment of a method for determining the timing for adapting the knowledge base (and thus the model) generated in accordance with the embodiments herein. The method is initially based on determining values of prediction accuracy (PA), grouping accuracy (GA), and persistence time accuracy (TA) for the selected alarms to be managed. At 1101, the TA accuracy may be determined using the alarms in set A1, as previously described. At 1102, the PA accuracy may be determined based on conditions E1, E2, E3, and E4 as set forth in FIG. 9. At 1103, the GA accuracy may be determined based on conditions E5 and E6 as set forth in FIG. 9.

Once the values of prediction accuracy (PA), grouping accuracy (GA), and persistence time accuracy (TA) are determined, these values are checked against predetermined thresholds. At 1110, the TA value for a given alarm is checked against a first predetermined threshold. As long as the TA value remains above the first predetermined threshold, the current optimal persistence time value continues to be used for managing alarms. However, at 1115, if the value of TA for a given alarm falls below the first predetermined threshold, the value (e.g., optimal value) of the persistence time P3 is redetermined in accordance with the methods of the embodiments described herein, using the most recent (or a cumulative representation of the) data stored in the knowledge base. The redetermination of the persistence time P3 may be considered to be an adaptation of the optimal persistence time of the model used to manage alarms in the network.

At 1120, the method includes checking the value of prediction accuracy PA for a given alarm against a second predetermined value. At 1125, when the value of the prediction accuracy falls below the second predetermined threshold, the values of both the prediction accuracy PA and the grouping accuracy GA are redetermined, e.g., the values of second set of alarms A2, third set of alarms A3, R1, P1, and P2 are redetermined in accordance with the methods of the embodiments described herein. If the value of the prediction accuracy PA is above the second predetermined threshold at the time of the check 1120, a check is performed for the grouping accuracy as described below.

At 1130, the method includes checking the value of the grouping accuracy GA for a given group of alarms against a third predetermined threshold. If the value of the grouping accuracy GA is equal to or above the third predetermined threshold, then no adaptation is performed for the grouping accuracy. At 1135, when the value of the grouping accuracy GA falls below the third predetermined threshold, then a corresponding one (or all) of the alarm groups are adapted in accordance with a process which includes redetermining the alarms in set A3.

The check operations 1110, 1120, and 1130 may all be performed at the same time or at different times. The timing of the checks may be performed according to a predetermined timing schedule programmed into the network management system, periodically at certain predetermined intervals, based on the occurrence of a certain event, randomly, and/or at other timings. The adaptations may be performed in real-time or at other times, e.g., after a certain period has passed or according to a set schedule. For the real-time adaptations, a most recent set of alarms may be used as A1. In one embodiment, adaptations are performed only after the system has been initiated, since at the beginning, only those groups/predictions with accuracies meeting the set thresholds are deployed.

Implementation

Figure 12:
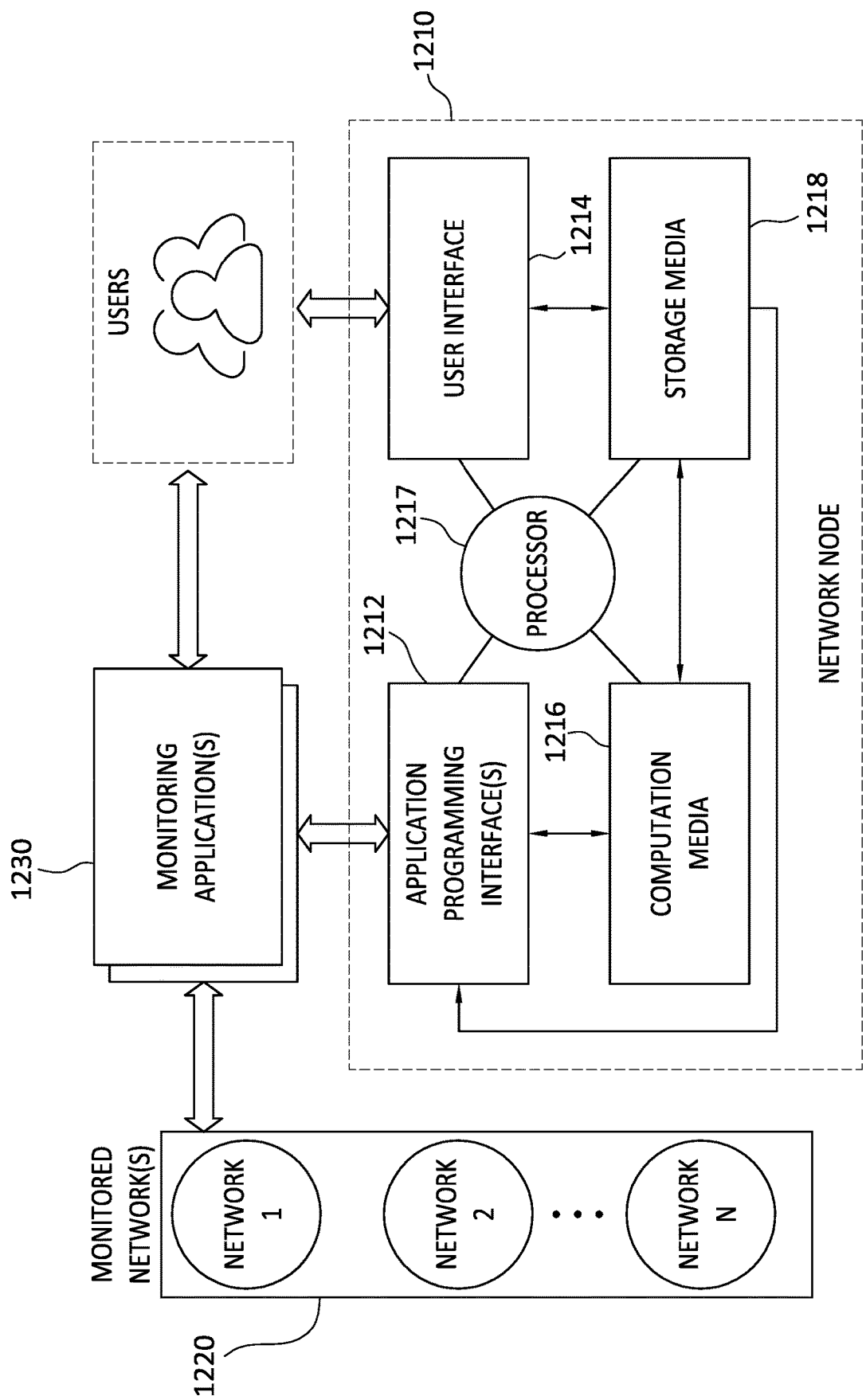
FIG. 12 illustrates an example application of the system and method embodiments.

FIG. 12 illustrates an example of how the system and method embodiments for managing alarms for a network may be implemented. In this example, the system and method embodiments are implemented in a network node 1210, which interacts with one or more networks 1220 or services that generate alarms, through one or more monitoring applications 1230. The networks may be the same type of networks or different network types that communicate with one another. The monitoring application(s) 1230 may be one or more network management systems (e.g., NETCOOL) located, for example, at a network operations center or another location.

The network node 1210 may include one or more application programming interfaces (APIs) 1212, a user interface 1214, computation media 1216, and storage media 1218. The APIs may enable the transfer of data between the node and the monitoring application(s). As an example, an Apache KAFKA stream-processing platform may be used for real-time processing and transfer of alarms between the monitoring application(s) and the node implementing the system and method embodiments. A REST API may be used to query the system for any required predictions or groups.

The user interface 1214 may allow for the generated alarm persistence times, alarm groups, alarm predictions, alarm patterns, and alarm accuracies at a given time and/or the evolution of such over a period of time. The user interface 1214 may also generate graphical representation(s) of patterns to indicate sequences of alarms that lead to a given alarm. The computation media 1216 may be based on one or more programming languages to implement the operations of the embodiments herein. The storage media 1218 may store all or part of input alarm data, the knowledge base, and outputs of the system and method embodiments. One or more processors and/or controllers 1217 may be included to performs the processing operations for the network node 1210 (including the operations of the system and method embodiments described herein.

In the present embodiment, the system and method embodiments are performed in a network node, e.g., a server connected to the network. In one embodiment, multiple servers may be used to implement the embodiments. For example, on server may host the computation media, processor and/or controller and another server may host the storage media. Other nodes which may implement the embodiments include physical and/or virtual network function (VNF) nodes. In other embodiments, the system and method embodiments may be performed in a network management system or another device that is coupled to or otherwise in communication with the network.

Figure 13:
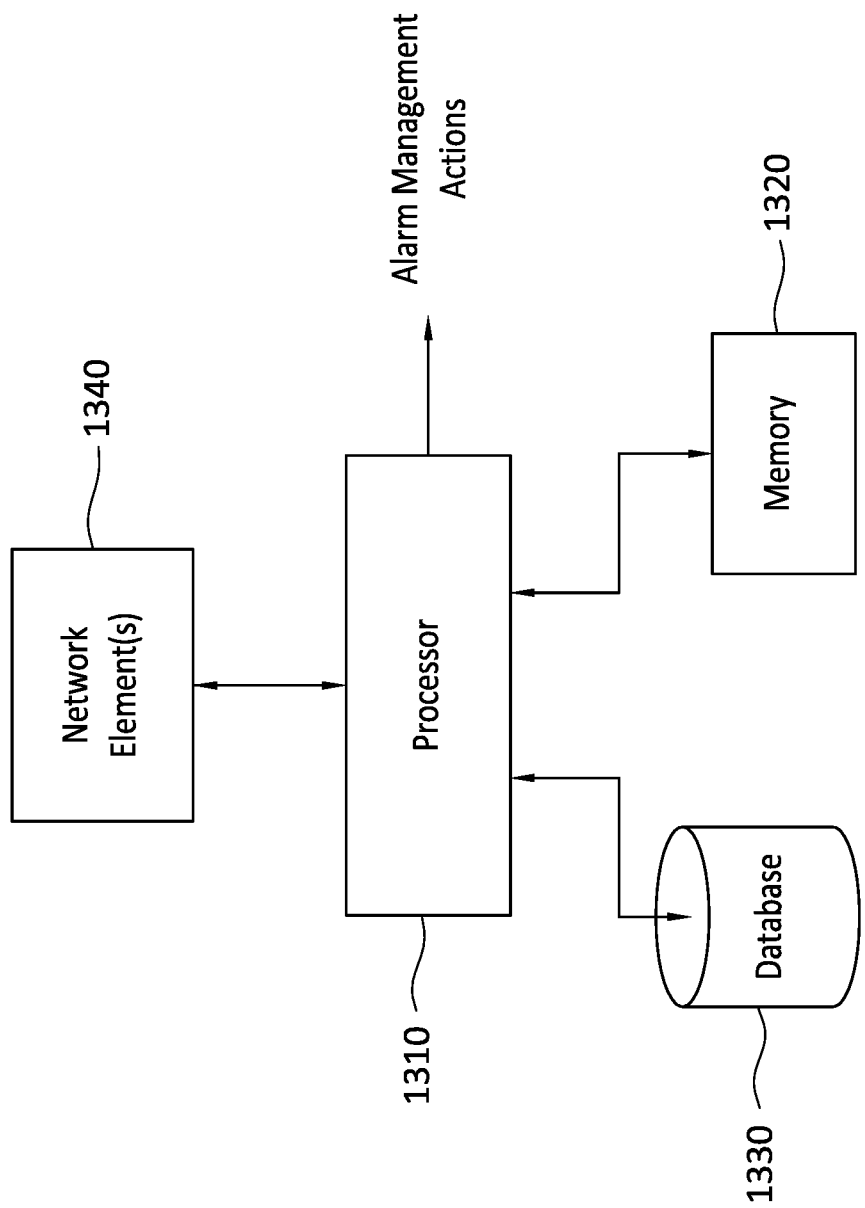
FIG. 13 illustrates an embodiment of a processing system for performing operations of the system and method embodiments.

FIG. 13 illustrates an embodiment of a processing system that may be used to perform the operations of the system and method embodiments. The processing system includes a processor 1310, a memory 1320, a database 1330, and network elements 1340. The processor 1310 may execute instructions stored in the memory 1320 for managing alarms in one or more networks. These instructions may correspond to control program(s) that generate and them implement the model used for alarm management and clearing/recovery measures. The instructions may also perform adaptation of the models and the attributes (e.g., persistence times, alarm grouping, prediction, etc.) upon which the models are based. The memory 1320 may therefore be regarded as a non-transitory computer-readable medium for causing the processor 1310 to implement the operations described herein. The database 1330 may include the knowledge base as previously described, based on data collected from the network element(s). Based on these operations and information, the processor 1310 may generate alarm management actions as previously described, e.g., alarm clearing or recovery, alarm adaptation, and/or other management operations.

In accordance with one or more of the aforementioned embodiments, a system and method is provided for managing alarms in one or more communication networks. The system and method involve generating a model to manage selected alarms, which model is based on attributes and/or other information stored in a knowledge base. The attributes include, for example, one or more of optimal persistence times for selected alarms, prediction of selected alarms, and alarm grouping used to predict or otherwise control alarms. These attributes may be calculated, monitored, and used as a basis for increasing the efficiency of operation of alarms generated in the network.

In one embodiment, the persistence times may be generated as optimal values that represent a balance between time and accuracy. These persistence times may be calculated to be sufficient long to allow for the underlying causes of alarms to resolve or clear themselves, thereby saving network resources and preventing delays.

In one embodiment, selected alarms may be predicted based on alarm type, affected network element(s), and location of concerned network elements may be performed. In addition, alarm predication may be performed without knowing the topology of the network (or relationships between and among the network elements). This is beneficial because the network management system (or other system implementing the embodiments) may not always have access to network topology information. In one case, alarm prediction may allow a recovery process to be initiated by the managing device before the underlying cause of the alarm actually develops. This may reduce network delays using prospective and proactive alarm management.

In one embodiment, alarms may be grouped, for example, to automatically generate predictions of all related alarms at the same time and to enable an aggregated recovery response. This increases efficiency because multiple alarms may be resolved simultaneously and more quickly, thereby saving network resources, computational overhead, and the need to involve human operators. This is also beneficial because networks and services dynamically change due to addition/removal of nodes/links, deployment of new services, and changes in user behavior. The embodiments described herein therefore are able to implement alarm management solutions to adapt, in an autonomous way, changes in both the network and service layers.

The methods, processes, and/or operations described herein may be performed by code or instructions to be executed by a computer, processor, controller, or other signal processing device. The code or instructions may be stored in the non-transitory computer-readable medium as previously described in accordance with one or more embodiments. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

The processors, managers, managing systems, servers, computation media, algorithms, models, knowledge base processing, and other signal-generating, calculating, and signal-processing features of the embodiments disclosed herein may be implemented in logic which, for example, may include hardware, software, or both. When implemented at least partially in hardware, processors, managers, managing systems, servers, computation media, algorithms, models, knowledge base processing, and other signal-generating, calculating, and signal-processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the processors, managers, managing systems, servers, computation media, algorithms, models, knowledge base processing, and other signal-generating, calculating, and signal-processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A non-transitory machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media and excludes transitory signals.

It should be appreciated by those skilled in the art that any blocks and block diagrams herein represent conceptual views of illustrative circuitry embodying the principles of the invention. Implementation of particular blocks can vary while they can be implemented in the hardware or software domain without limiting the scope of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for managing alarms in a network having defined alarm thresholds, the method comprising:
    identifying a first set of alarms based on data in a knowledge base;
    determining at least one attribute for each alarm in the first set of alarms;
    generating a model based on the at least one attribute, wherein the model is implemented by one or more machine learning modules that are configured to determine optimal persistence times for managing the first set of alarms;
    determining a second set of alarms, wherein the second set of alarms is a reduced subset of alarms that occurred or were triggered within a predetermined time window before or after a particular alarm in the first set of alarms;
    using machine learning to determine relationships between the reduced subset of alarms and the particular alarm, thereby predicting when the particular alarm may be triggered in the network; and
    applying the model to change at least one threshold in the defined alarm thresholds to reduce power consumption of network resources, wherein the at least one attribute includes at least one of a persistence time for one or more alarms in the first set of alarms, an alarm group derived from the first set of alarms, and predictions for alarms in the first set of alarms.

2. The method of claim 1, wherein the at least one attribute further comprises a persistence time for each alarm in the first set of alarms.

3. The method of claim 2, wherein the persistence time for each alarm is based on at least one historical time when the alarm was automatically resolved without intervention.

4. The method of claim 3, further comprising:
    applying an iterative algorithm to determine the persistence time for each alarm in the first set of alarms, the iterative algorithm setting the persistence time based on an optimal balance between time and accuracy of the alarm in relation to a predetermined probability function and a predetermined accuracy threshold.

5. The method of claim 1, wherein the at least one attribute further comprises a prediction of when each alarm in the first set of alarms occurs.

6. The method of claim 5, further comprising:
    filtering out alarms from the second set of alarms that do not satisfy a criteria;
    determining a pattern among remaining alarms in the second set of alarms that were not filtered out; and
    generating alarm predictions for the remaining alarms in the second set of alarms based on the pattern.

7. The method of claim 6, wherein determining the pattern among remaining alarms in the second set of alarms is performed using a decision-tree algorithm.

8. The method of claim 1, wherein the at least one attribute further comprises an alarm group derived from alarms in the first set of alarms.

9. The method of claim 8, further comprising:
    identifying alarms in the first set of alarms that originate from a same cause as an alarm in the first set of alarms, wherein the alarms that originate from the same cause are expected to occur together with a predetermined probability;
    for each identified alarm, applying a linear correlation to time series data to determine ones of the identified alarms that arrive together; and
    generating a group based on the identified alarms that arrive together.

10. The method of claim 1, further comprising:
    determining accuracy of the knowledge base; and
    adaptively changing the at least one attribute based on the determined accuracy of the knowledge base.

11. The method of claim 10, further comprising:
    generating a set of alarms received in real-time from the network;
    comparing the set of alarms received in real-time to the knowledge base relative to the at least one attribute, the at least one attribute including a first attribute and a second attribute, the first attribute corresponding to predicted alarms and the second attribute corresponding to persistence times;
    maintaining one or more count values based on the comparisons; and
    modifying the at least one attribute or the knowledge base based on the one or more count values.

12. The method of claim 1, wherein:
   determining the at least one attribute includes determining the persistence time for each alarm in the first set, the alarm group, and the alarm predictions, and
   the model is generated based on the persistence time for each alarm in the first set, the alarm group, and the alarm predictions.

13. A system for managing alarms in a network having defined alarm thresholds, comprising:
   a memory configured to store a knowledge base; and
   a processor configured to
   identify a first set of alarms based on data in the knowledge base,
   determine at least one attribute for each alarm in the first set of alarms,
   generate a model based on the at least one attribute, wherein the model is implemented by one or more machine learning modules that are configured to determine optimal persistence times for managing the first set of alarms,
   determine a second set of alarms, wherein the second set of alarms is a reduced subset of alarms that occurred or were triggered within a predetermined time window before or after a particular alarm in the first set of alarms,
   use machine learning to determine relationships between the reduced subset of alarms and the particular alarm, thereby predicting when the particular alarm may be triggered in the network, and
   apply the model to change at least one threshold of the defined alarm thresholds to reduce power consumption of network resources, wherein the at least one attribute includes at least one of a persistence time for one or more alarms in the first set of alarms, an alarm group derived from the first set of alarms, and predictions for alarms in the first set of alarms.

14. The system of claim 13, wherein the at least one attribute further comprises a persistence time for each alarm in the first set of alarms.

15. The system of claim 14, wherein the persistence time for each alarm is based on at least one historical time when the alarm was automatically resolved without intervention.

16. The system of claim 15, wherein the processor is configured to apply an iterative algorithm to determine the persistence time for each alarm in the first set of alarms, the iterative algorithm configured to set the persistence time based on an optimal balance between time and accuracy of the alarm in relation to a predetermined probability function and a predetermined accuracy threshold.

17. The system of claim 13, wherein the at least one attribute further comprises a prediction of when each alarm in the first set of alarms occurs.

18. The system of claim 17, wherein the processor is configured to:
   filter out alarms from the second set of alarms that do not satisfy a criteria;
   determine a pattern among remaining alarms in the second set of alarms that were not filtered out; and
   generate alarm predictions for the remaining alarms in the second set of alarms based on the pattern.

19. The system of claim 13, wherein the at least one attribute further comprises an alarm group derived from alarms in the first set of alarms.

20. The system of claim 19, wherein the processor is configured to:
   identify alarms in the first set of alarms that originate from a same cause as an alarm in the first set of alarms, wherein the alarms that originate from the same cause are expected to occur together with a predetermined probability;
   for each identified alarm, apply a linear correlation to time series data to determine ones of the identified alarms that arrive together; and
   generate a group based on the identified alarms that arrive together.

* * * * *